United States Patent
Wu

[11] 3,876,677
[45] Apr. 8, 1975

[54] CYCLOTRI-SILOXANES CONTAINING SILICON-BONDED FLUOROALKOXYALKYL GROUPS

[75] Inventor: Tse C. Wu, Melrose, Mass.

[73] Assignee: General Electric Company

[22] Filed: June 6, 1974

[21] Appl. No.: 476,936

[52] U.S. Cl.. 260/448.2 B; 260/46.5 G; 260/46.5 Y
[51] Int. Cl. ............................................. C07f 7/08
[58] Field of Search .............................. 260/448.2 B

[56] References Cited
UNITED STATES PATENTS

| | | | |
|---|---|---|---|
| 3,132,117 | 5/1964 | Schmidt .................. | 260/448.2 B X |
| 3,331,813 | 7/1967 | Pittman et al............ | 260/448.2 B X |
| 3,484,470 | 12/1969 | Pittman et al............. | 260/448.2 B |
| 3,529,003 | 9/1970 | Rausen et al................ | 260/448.2 B |
| 3,809,783 | 5/1974 | Pittman et al............ | 260/448.2 B X |

*Primary Examiner*—Paul F. Shaver
*Attorney, Agent, or Firm*—Donald J. Voss; Edward A. Hedman; Granville M. Pine

[57] ABSTRACT

Novel cyclotrisiloxanes having the formula

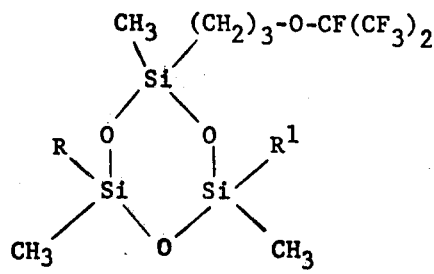

wherein R and R[1] are $CH_3$ or $-(CH_2)_3-O-CF(CF_3)_3$ are intermediates for the preparation of oil- and heat-resistant silicone rubbers.

4 Claims, No Drawings

CYCLOTRI-SILOXANES CONTAINING SILICON-BONDED FLUOROALKOXYALKYL GROUPS

This invention relates to cyclotrisiloxanes containing silicon-bonded fluoroalkoxyalkyl groups.

DESCRIPTION OF THE INVENTION

Organosilicone rubbers containing silicon-bonded alkoxyalkyl groups have been found to possess a remarkable resistance to the deteriorating effects of heat, water and hot oils. They have also been found to have a reduced degree of swell after vulcanization and immersion in fuel oils, lubricating oils, hydraulic fluids and organic solvents. This makes them useful for automotive, industrial, marine, aircraft and applications in the form of electrical insulation, gaskets, hoses, and the like. Such improved rubbers are the subject matter of a copending application by the same applicant, Ser. No. 476,935 entitled "Organosiloxane Rubbers Containing Silicon-Bonded Fluoroalkoxyalkyl Radicals" filed June 6, 1974, assigned to the assignee of this application and incorporated herein by reference.

The present invention provides novel compositions which are useful as intermediates in the preparation of organosiloxane rubbers containing silicon-bonded fluoroalkoxyalkyl radicals.

DESCRIPTION OF THE INVENTION

According to this invention there are provided cyclic trisiloxanes of Formula (I):

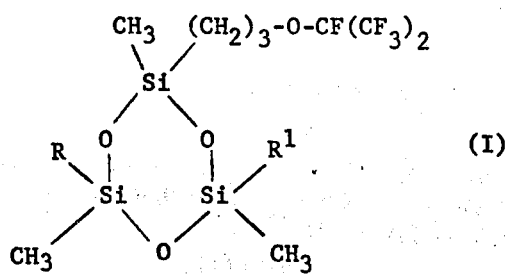

(I)

wherein R and $R^1$ are, independently, $CH_3$ or $$-(CH_2)_3-O-CF(CF_3)_2$$

Preferred embodiments are:
3-heptafluoroisopropoxypropylpentamethylcyclotrisiloxane, i.e., a compound of Formula I wherein R and $R^1$ are each methyl;
2,4-bis(3-heptafluoroisopropoxypropyl)tetramethylcyclotrisiloxane, i.e., a compound of Formula I wherein R is $CH_3$ and $R^1$ is $-(CH_2)_3-O-CF(CF_3)_2$; and
2,4,6-trimethyl-2,4,6-tris(3-heptafluoropropoxypropyl)cyclotrisiloxane, a compound of Formula I wherein R and $R^1$ are each $-(CH_2)_3-O-CF(CF_3)_2$.

The first preferred embodiment, 3-heptafluoroisopropoxypropylpentamethylcyclotrisiloxane (Ia), can conveniently be prepared by condending the corresponding dichloro-3-heptafluoroisopropoxypropylmethylsilane (II) with tetramethyldisiloxane diol (III) according to the following:

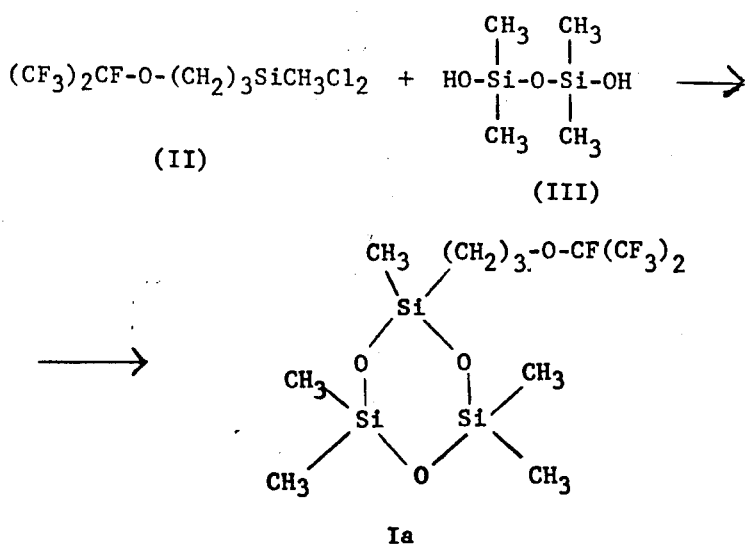

Compound II is available by the procedure of U.S. Pat. No. 3,422,131, Example 1. Compound III is produced by methods well known to those skilled in this art. The condensation of II and III is carried out under anhydrous conditions, preferably in an inert solvent, e.g., toluene, and preferably in the presence of an acid-binding agent, e.g., pyridine. The product forms rapidly, e.g., in ½ in 3 hours, at room temperature, and can be recovered and purified, e.g., by distillation. A detailed example of the preparation will be provided hereinafter.

The second preferred embodiment, 2,4-bis(3-heptafluoroisopropoxypropyl)tetramethylcyclotrisiloxane (Ib), can conveniently be prepared by condensing the corresponding sym-bis(3-heptafluoroisopropoxypropyl)-dimethylsiloxane diol (IV) with dichlorodimethylsilane (V) according to the following:

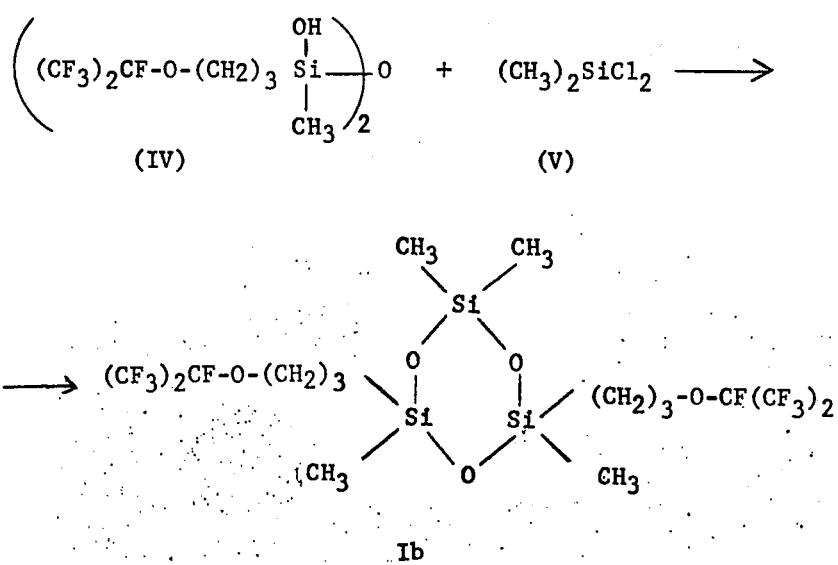

Compound IV is available by partially hydrolyzing the dichlorosilane II with water in pyridine/toluene; and hydrolyzing the dimer dichloride so produced in the presence of sodium bicarbonate. (The same dimer diol can be prepared directly from the hydrolysis of the dichlorosilane as a byproduct). Dimethyldichlorosilane IV is available commercially. The condensation of IV and V is carried out in anhydrous conditions, as described for Ia, preferably using an acid binding agent, e.g., pyridine. The product is recovered and purified in conventional ways, e.g., by fractional distillation. A detailed preparative procedure will be described hereinafter.

The third preferred embodiment, 2,4,6-tris(3-heptafluoropropoxypropyl)-2,4,6-trimethylcyclotrisiloxane (Ic), can be conveniently prepared by cyclizing Compound (II) either in dimethyl sulfoxide at moderately elevated temperatures, e.g., 50° to 80°C., or preferably in a solution of a solvent such as ethyl acetate in the presence of zinc oxide:

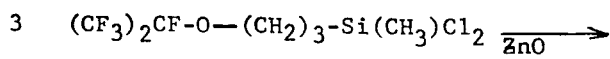

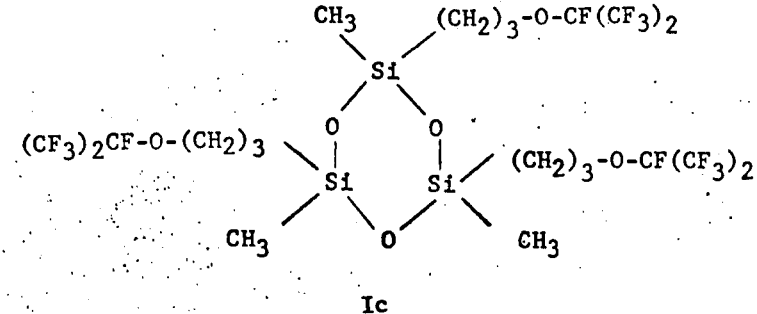

This reaction is preferably carried out by dissolving Compound II in anhydrous ethyl acetate and adding zinc oxide in small amounts until about an equimolar amount is present. Heat is evolved and the zinc oxide goes into solution. After about 2 to 4 hours, the mixture is washed with water and the product is recovered by distillation. This procedure will be illustrated in detail hereinafter.

The cyclic trisiloxanes of Formula I can be polymerized to rubber grade polymers of relatively high molecular weight, alone or admixture with other cyclic materials, and with small amounts of intermediates which provide vinyl- and phenyl-bonded silicon radicals, by alkaline catalysis. Vinyl groups provide cross-linking sites for subsequent rubber curing. In general, from 100 to 200 ppm of catalyst, e.g., potassium naphthalene, is added (based on the trimer) and the mixture is heated at 100° to 200°C. for from less than one minute to about an hour. The mixture eventually becomes a gum, due to polymerization, and the extent of polymerization can be followed in conventional ways, e.g., by intrinsic viscosity measurements. Typically, the intrinsic viscosity will range from 0.3 to 1.0 dl./g.

The polysiloxane gums can be compounded with fillers, e.g., silica fillers, and with vulcanizing agents, e.g., dicumyl peroxide, and cured into swell-resistant elastomers. These techniques are well-known to those skilled in the art. The procedures are exemplified in detail in the above-mentioned copending application of the present applicant.

DESCRIPTION OF THE PREFERRED EMBODIMENTS

The following examples are illustrative only and should not be construed as limiting the claims in any manner whatsoever.

EXAMPLE 1

3-Heptafluoroisopropoxypropylpentamethylcyclotrisiloxane (Ia)

a. Dichloro-3-heptafluoroisopropoxypropylmethylsilane. In a 2-liter, 3-necked flask fitted with a dropping funnel, a stirrer, and a condenser is placed a mixture containing 460 ml. (4.4 m.) of CH₃HSiCl₂ and 0.2 g. of platinum chloride. The reaction mixture is heated gently to reflux. To this is added 500 g. (2.2 m.) of allyl heptafluoroisopropyl ether over a period of 2.5 hours at such a rate to keep the mixture in gentle reflux. After addition the mixture is refluxed for 3 more hours. Low boiling fractions including the excess methyl-hydrogen are removed by distillation until the head temperature reaches 150°. A fraction boiling at 150°–190° is collected and refractionated at a 10:1 reflux ratio in a Todd column to give 646.8 g. (86%) of product boiling at 75°–77°/24 mm.

b. 3-Heptafluoroisopropoxypropylpentamethylcyclotrisiloxane

Two one-liter toluene solutions, one containing 341.1 g. (1 m.) of dichloro-3-heptafluoroisopropoxypropylmethylsilane and the other containing 166.3 g. (1 m.) of tetramethyldisiloxane-1,3-diol and 178 ml. (2.2 m.) of pyridine, are added simultaneously and at the same rate to a flask containing 2 liters of toluene. The reaction mixture is stirred vigorously at room temperature during the 2-hour addition period and 2 more hours after that. After the solids have been removed by filtration, the filtrate is washed 3 times with water, dried over Na₂SO₄, filtered, and evaporated. The residue is distilled to give 211 g. (49%) of crude product at 43°–110°/9 mm. by flash distillation. Refractionation of this material in a Todd column produces 184 g. (42%) of pure product boiling at 83°–85°/10 mm. Its structure is consistent with its infrared spectrum.

EXAMPLE 2

2,4-Bis(3-heptafluoroisopropoxypropyl)-2,4,6,6-tetramethylcyclotrisiloxane (Ib)

a. sym-Bis(3-heptafluoroisopropoxypropyl)dichlorodimethyldisiloxane. A solution containing 205 g. (0.6 m.) of dichloro-3-heptafluoroisopropoxypropylmethylsilane in 200 ml. of toluene is placed in a 1-l. 3-neck flask fitted with a stirrer, a syringe and a condenser. A solution containing 12.1 ml. (0.15 m.) of pyridine dissolved in 5.4 ml. (0.3 m.) of water is added through the syringe over a period of 3 hours at 85° with vigorous stirring. The mixture is filtered and evaporated. Distillation of the residue gives a fraction boiling at 100°–160°/10 mm. Refractionation of this distillate in a Todd column produces a 19% yield of the desired product boiling at 133°–134°/9 mm.

b. sym-Bis(3-heptafluoroisopropoxypropyl)dimethyldisiloxanediol. In 76.7 g. (0.12 m.) of sym-Bis(3-heptafluoroisopropoxypropyl)dichlorodimethyldisiloxane dissolved in 100 ml. of ethyl ether is added to a slurry containing 70 g. of NaHCO₃ in 350 ml. of ether over a period of 45 minutes. The mixture is stirred for another hour until no more gas is evolved. It is filtered to remove solids. Evaporation of the filtrate, followed by evacuation to remove the solvent produces a solid residue. One recrystallization in hexane and another one in toluene gives 57.5 g. (81%) of white, fluffy solids melting at 67.5°–68.5°.

c. 2,4-Bis(3-heptafluoroisopropoxypropyl)tetramethylcyclotrisiloxane. A procedure similar to Example 1, step (b) is employed by using 59 g. (0.1 m.) of sym-bis(3-heptafluoroisopropoxypropyl)dimethyldisiloxanediol, 12.1 ml. (0.1 m.) of dichlorodimethylsilane and 20 ml. (0.25 m.) of pyridine. The toluene solution has to be heated to dissolve the diol. The desired product is obtained by fractional distillation as a liquid boiling at 109°–112°/3 mm in 40% yield.

EXAMPLE 3

2,4,6-Tris(3-heptafluoropropoxypropyl)-2,4,6-trimethylcyclotrisiloxane (Ic)

A solution containing 509 g. (1.49 m.) of 3-heptafluoroisoipropoxypropylmethyldichlorosilane in 3 liters of anhydrous ethyl acetate is placed in a 5-liter, 3-necked flask fitted with a stirrer, condenser, and a stopper. Zinc oxide (128 g. 1.57 m.) is added in small portions over a period of one hour. Heat is evolved and most of the zinc oxide goes into solution. The reaction mixture is stirred for 4 hours and filtered to remove a small amount of solids. After evaporation of some solvent from the filtrate to about 1 liter volume, the solution is washed 3 times with water, separated, dried over Na₂SO₄, filtered, and evaporated. The residue is distilled to give 190 ml. of liquid at 149°–175°/5 mm. Refractionation in a Todd column using a 50:1 reflux ratio produces 221 g. (52%) of product boiling at 150°–159°/3 - 5 mm. VPC and IR analyses show that it consists of two stereoisomers.

The invention as described above, in all of its embodiments, is defined by the appended claims.

I claim:

1. A cyclic trisiloxane of the formula

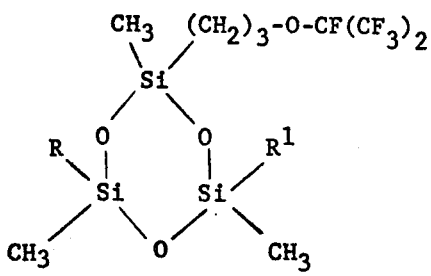

wherein R and R¹ are, independently, CH₃ or

—(CH₂)₃—O—CF(CF₃)₂.

2. A compound as defined in claim 1 wherein R and R¹ are each CH₃.

3. A compound as defined in claim 1 wherein R is CH₃ and R¹ is

—(CH₂)₃—O—CF(CF₃)₂.

4. A compound as defined in claim 1 wherein R and R¹ are each

—(CH₂)₃—O—CF(CF₃)₂.

* * * * *